United States Patent [19]
Kaczmarek et al.

[11] 3,834,357
[45] Sept. 10, 1974

[54] LOW-WATER CUT OFF SYSTEM

[75] Inventors: Leo W. Kaczmarek, Chicago; Charles E. Adamson, Addison, both of Ill.

[73] Assignee: International Telephone and Telegraph Corporation, New York, N.Y.

[22] Filed: June 7, 1973

[21] Appl. No.: 367,856

[52] U.S. Cl. .............................. 122/504, 122/504.2
[51] Int. Cl. ............................................ F22b 37/42
[58] Field of Search ......... 122/448, 451, 504, 504.2

[56] References Cited
UNITED STATES PATENTS

| | | | |
|---|---|---|---|
| 2,385,161 | 9/1945 | Pinkerton | 122/504.2 |
| 2,446,778 | 8/1948 | Mesh | 122/504 |
| 3,310,039 | 3/1967 | Holt | 122/504 |
| 3,366,095 | 1/1968 | DeLeonardis | 122/504 |

*Primary Examiner*—Kenneth W. Sprague
*Attorney, Agent, or Firm*—J. B. Raden; D. P. Warner

[57] ABSTRACT

A system is disclosed for monitoring the water level in hot water boilers or the like and, when the water level falls below a prescribed level, turning off a burner and sounding an alarm. The system includes a manual control for testing whether the system is actually functioning, or not, and also whether it is functioning efficiently, or not. It incorporates improved probe means and means enabling servicing to be more efficiently carried out. Manual reset, or start, means are included to assure that the system will start-up after halting only when an attendent is at hand and thus prevents dry-firing.

10 Claims, 7 Drawing Figures

LOW-WATER CUT OFF SYSTEM

BACKGROUND OF THE INVENTION

1. Field of the Invention

The present invention relates to a safety system for sensing the presence of water above a prescribed height in a hot water tank, or the like, and providing a change in an electric circuit when the water level drops below the prescribed height. More particularly, the invention relates to an electric mechanism, including a probe formed of a corrosion resistant conductive material to complete an electric circuit through water when the water level is high and to de-energize the circuit when the water level falls below a prescribed level. When the circuit is de-energized it gives rise to signals indicating the water level is low. The system includes manual test means to enable a test to be completed by an attendent, and manual reset means to enable the system to be restarted by an attendent. The use of manual test and reset means assures that an attendent will be presented when the system is tested and when it is restarted, thus assuring that the boiler will not unknowingly be fired when the water level is too low for safe firing.

2. Description of the Prior Art

The prior art includes control systems incorporating probes which are placed in contact with water in a hot water boiler, or the like, to complete a circuit from a power supply through a relay and through the water in the boiler to a ground terminal common to the power supply. An example of such art is shown in U.S. Pat. No. 3,366,095. The known prior art relates generally to automatic systems which; once started, turn the burner "off" when the water level falls below a prescribed level and turn them back "on" again when the water rises above the prescribed level. In theory, these prior art devices should function satisfactorily. In practice, they give rise to unstable conditions; turning the boilers rapidly on and off when the water level is near the probe level and necessitating the use of time delay mechanisms to prevent this rapid on and off action.

A device presently on the market includes an electrically operated water level control, with an electrode, or probe, installed in a boiler, through a tapped hole. An associated control circuit uses the water as a conductor; closing a burner circuit when the water level rises above the electrode and opening the circuit when it falls below the electrode.

The control circuit operates from the secondary side of an isolation transformer. One lead of the secondary is grounded to the control housing, the other lead is placed in series with the coil of a relay, the probe, the boiler water and the boiler shell, which serves as a common ground. A test lamp and test lamp switch are connected together in series between the common ground and a terminal interconnecting the relay and the probe thereby forming a test circuit in parallel to the probe.

The relay has two sets of contacts, with one set of contacts being used to open or close the burner circuit of a hot water boiler. To test the condition of the probe, use is made of the test lamp and switch referred to above. The switch is a normally open momentary contact switch in series with a miniature lamp in a circuit parallel to the probe only. Closing the momentary switch will cause the lamp to glow. The brightness of the lamp gives an indication of the probe condition and water conductivity. If the lamp lights, the probe is not shorted out. The more conductive the water, the dimmer the light. If the lamp does not light, it indicates that the probe is being short circuited to ground.

In the alarm circuit, the hot lead of a 120 V. AC line is connected to the normally open contacts of a single pole double throw switch. The primary side of the transformer is connected in parallel with the second set of contacts on the relay and a heater for a bi-metallic tripping mechanism for the single pole double throw switch. The normally closed side of the switch is connected to one alarm connection on the terminal block. With the boiler water above the probe, the switch plunger is depressed, the normally open contacts are closed; the transformer primary and the probe circuits are energized. With the water below the probe, the circuit is opened causing the relay to drop out. The normally open second set of contacts on the relay close, heating the bi-metal releasing the switch and sounding the alarm, through the normally closed contacts. When the boiler is filled and water covers the probe, a reset button must be pushed to release the bi-metal trip mechanism and use the normally open switch contacts to energize the control circuit. The heater element of the trip mechanism gives the device a time delay feature. With a low water condition, the manufacturer claims it takes 90 seconds to trip the switch mechanism.

Several problems occur with apparatus constructed in accordance with the foregoing. The most serious problem arises from the risk of boiler damage, resulting when the test lamp switch is blocked in the closed position. The boiler can be damaged by heat from the burners in this way, since the test lamp and the test lamp switch are connected in parallel with the probe circuit and can maintain current through a relay even though the water level drops below the level of the probe.

With the arrangement of the prior art, the probe can be installed in only one position. This presents difficulties where pipe threads are involved.

The restricted space between the electrical housing and the boiler wall results in high temperatures in the housing, adversely affecting the life of the components in the housing.

When a low water condition occurs — especially with a bouncing or fluctuating water level, the relay will frequently chatter for a period of 90 seconds or more, which may have a detrimental effect on a gas valve or other components.

To install this prior art device on a boiler, the electrical housing must be removed from the probe, the probe must be installed and then the housing must again be attached to the probe.

SUMMARY OF THE INVENTION

In view of the foregoing, it is an object of the present invention to provide a low water cut-off mechanism for hot water boilers which will turn-off a boiler and provide an alarm signal when water in the boiler drops below a prescribed level, or in the event of a power failure.

Further objects are to provide means for testing the cut-off system to make sure it is operational and to provide an indication of the efficiency of operation. Yet another object is to provide means for testing the operation of the mechanism while avoiding the possibility of causing boiler damage through failure of the testing means. Still further objects include the provision of a fail safe feature with a cut-off mechanism by which the mechanism will cut-off when power fails for any reason and stay off until restarted by hand, thereby assuring a completely safe system. Another object is to provide an improved cut-off mechanism which can be installed in a boiler tank for use without being disassembled.

to meet the foregoing and related objects, a safety system is provided according to the present invention for sensing the presence of water above a prescribed height in a hot water tank, or the like, and providing a change in an electric circuit when the water level drops below the prescribed height. The change in the electric circuit gives rise to an electric signal useful to sound an alarm, turn off a boiler, or provide electric control for other functions. More particularly, the invention relates to an electrically controllable mechanism, including a probe and a relay, useable as a low-water cut-off system. The probe is formed of a corrosion resistant conductor to complete an electric circuit through water when it is immersed in the water to energize the relay and to open the electric circuit and de-energize the relay when the water level drops below the position of the probe. The probe is shaped to shed accumulated mineral deposits from its surface with changes in temperature. Operation and release of the relay provides changes in the electric circuit and enables an indication of low water level to be made, the burner of a boiler to be turned off, an alarm to be operated, or other functions to be carried out. The system includes manual test means to enable a test to be completed to activate a visual indicator when the circuit is complete through the tank and the probe. Manual reset means are provided to enable the system to be restarted once it turns off; operation of the manual reset being necessary to reactivate the system and making it certain that an attendent must be apprised of the fact of low water level, and thereby making certain that the system will not accidentally restart when the water level is low.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
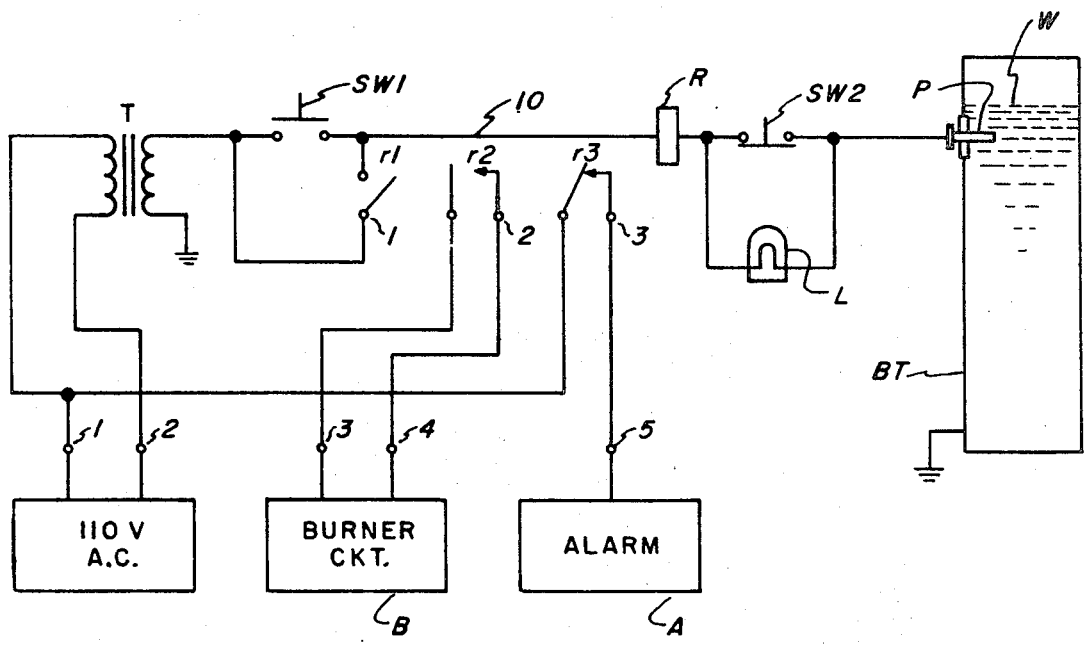
FIG. 1 is a schematic drawing depicting electric circuits employed in the practice of this invention.

Turn first to the wiring diagram of FIG. 1 for a description of a preferred probe control circuit and of manual reset and test circuits of use in the practice of this invention.

In the illustrated circuit, power is applied across terminals 1 and 2, using terminal 2 as the common, or ground, terminal. The voltage applied may be from an ordinary 110 volt 60 cycle source. The transformer T may preferably have a 1:1 transformer ratio to provide isolation of the circuit from the power and to minimize the electrical shock hazard. Other transformer ratios may be preferred in particular cases.

The switch SW1 is a momentary-contact, normally open switch which serves as a reset switch which must be manually operated to energize the system when it is in the state of rest illustrated in FIG. 1.

As will be seen from FIG. 1, closure of SW1 will establish a metallic connection between the secondary winding of T through the line 10, the relay R, and normally closed switch SW2 to the probe P. At this time, if the probe is properly installed in a boiler tank BT, the water level W in the tank reaches the probe, and power is present on terminals 1 and 2, current will flow from P through the water and walls of the tank to the ground terminal of the secondary winding causing the relay R to be energized. Energization of Relay R will cause it to activate its contacts $r1$, $r2$ and $r3$; causing contacts $r1$ and $r2$ to close and causing contact $r3$ to open. Closure of $r1$ will complete a latching circuit for relay R which will maintain R in its energized state until either the water level in the boiler tank drops below the level of the probe or there is a power failure. So long as R is energized, contact $r2$ will remain closed to complete a circuit between terminals 3 and 4 through which power is supplied to the boiler burner circuits B. Similarly, so long as R is energized contact $r3$ will be kept open so that no signal will be supplied to an alarm circuit A connected to terminal 5.

From the foregoing, it is clear that if the water level in the boiler drips below the probe P or there is a failure of power through the secondary of transformer T, then the relay R will be de-energized and the contacts $r1$, $r2$ and $r3$ will revert to the normal states indicated in FIG. 1. When the contacts return to the positions shown in FIG. 1, power will be removed from the probe P and from the burner circuits. Power will be applied through closed contact $r3$ over terminal 5 to an alarm circuit if power is available through T and the loss of power to R is due to loss of contact between the probe P and water in the tank. If the relay R opens because of loss of power across terminals 1 and 2, then the alarm connected to 5 will not be energized. Such a complete loss of power will normally be evident from other indicators associated with the power supply such as electric lights, clocks, independent alarms, etc. If desired, however, an independent power supply, such as a battery supply, may be provided across terminals $r3$ or across other terminals (not shown) of the relay to provide an indication that there has been a failure in the system.

The normally closed momentary-open switch SW2 serves as a test switch. It performs dual functions when considered with the lamp L. The first of these functions is to provide an indication of whether the system is operating or not. If the system is in operation, the voltage across the lamp L will cause it to light-up when the switch contacts are open; if it is not in operation, there will be no voltage across L and no light will be produced. The second function performed by SW2 in connection with L is to provide an indication by the brightness of L whether the probe P has become encrusted with deposits, or not. The probe is preferably formed of stainless steel which is relatively corrosion free, but in the environment of a boiler deposits of various minerals will tend to build-up on the probe. As deposits build-up on the probe, the resistance to the flow of current increases, causing a gradual reduction in current flow between the probe and the water in which it is immersed. As the current flow decreases, the brightness of the lamp L will be reduced during tests so that a dimly lit lamp will be an indicator that the probe has become fouled and should be cleaned, or replaced.

Figure 2:
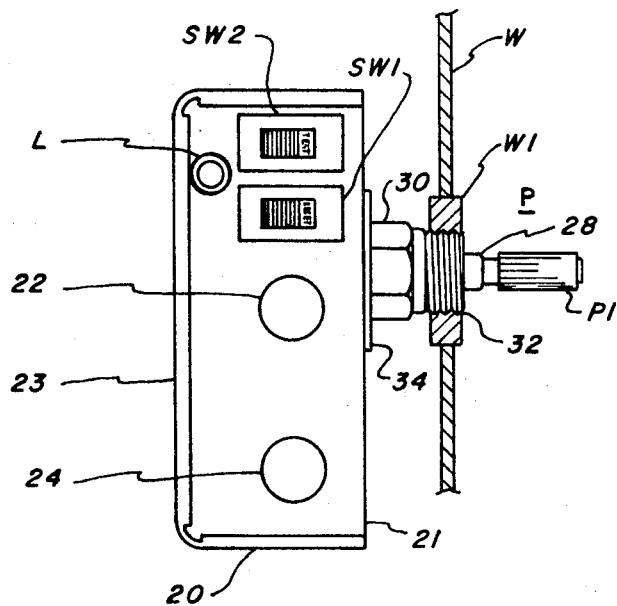
FIG. 2 is a view of a cut-off switch as it appears when mounted for use.

FIG. 2 is an elevation of an embodiment of a low water cut-off switch according to the invention as it would appear when mounted through the wall of a tank. In this view, the test switch SW2, the reset switch SW1 and the circuit test lamp L are enclosed in a housing, or box, represented by block 20 having typical knock-outs at 22 and 24. The box 20 has a closed face at 21 and will be supplied with a cover as indicated at 23.

A probe assembly is indicated at P. The assembly includes a probe element P1, an insulator 28, a support body 30, and an electrode flange 34. A threaded area at 32 on the body 30 may be formed by conventional ¾ inch pipe threads, or the like, for use in mounting the probe assembly through the wall W-W1 of a container such as a hot water boiler.

Figure 3:
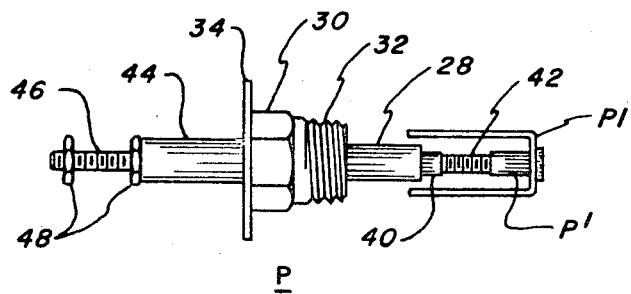
FIG. 3 is a view of a probe assembly of use in an exemplary cut-off switch.

A more detailed showing of the probe assembly is presented in FIG. 3. In this view, the probe element P1 is seen from a different viewpoint such that an internally threaded probe hub, or sleeve, p1 forming part of the probe element P1 is shown secured to the threaded end 42 of a conductive shaft 40. The probe hub may be integral to the probe element or may be secured to the probe element by staking, welding or other suitable means. The shaft 40 extends through an axial bore in the insulator 28, a bore through the supporting body 30, the flange 34 and a further insulator 44 to terminate with threads at 46. A suitable source of potential, as from the secondary winding of the transformer T, (shown in FIG. 1) may be connected to the shaft 40 by nuts 48, or other suitable means.

Figure 4:
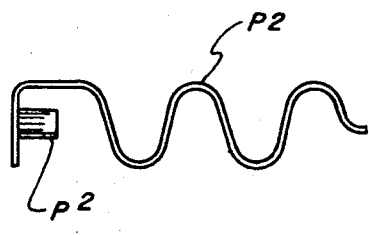
FIGS. 4 and 5 are side views of an exemplary probe of use with a probe assembly.
Figure 5:
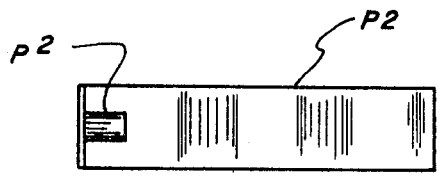

FIG. 4 is a side view of an embodiment of a second exemplary probe element designated P2. As shown, this probe element has a curved profile shaped rather like a piece of hard ribbon candy when viewed from the side, rather than having the rectangluar profile characterisitic of probe element P1. Probe element P2 includes a probe hub, or sleeve, p2 which may be internally threaded to mate with the threads 42 on the conductive shaft 40. FIG. 5 is a bottom view of FIG. 4 illustrating that the probe P2 is formed by a relatively wide strip of stainless steel or the like.

It will be noted that probe elements P1 and P2 both are bent in one fashion or another. This characteristic in their shape presents two advantages. One advantage is that larger contact areas between the probe elements and the water may be attained without the probe elements taking up excessive amounts of space between the rather closely spaced walls of a modern boiler. Another advantage is that the curves, or bends, provide a self-cleaning feature due to the forces that are brought to bear on mineral deposits on the probes as the probes expand and contract from heating and cooling.

Figure 6:
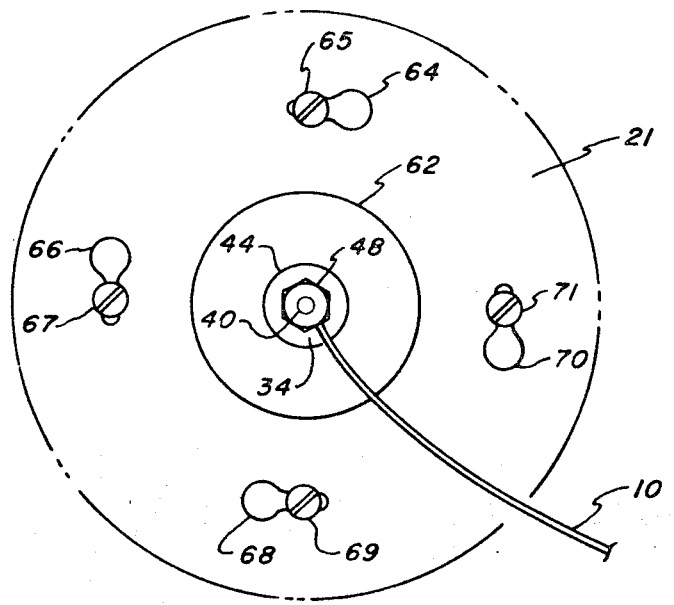
FIG. 6 is an end view of the probe assembly showing a portion of the supporting housing viewed from the left side of FIG. 2.

FIG. 6 is an end view of the probe assembly P and the surrounding wall of the box 20 as viewed from the left side of FIG. 2. In this view, the wall 21 of the box 20 is shown to incorporate an opening 62 through which the probe assembly P is fitted. The conductive shaft 40, a nut 48, insulator 44 and a portion of the face of the flange 34 are shown. An insulated conductor 10 is indicated to be fastened to the conductive shaft 40. Openings at 64, 66, 68 and 70 are arranged so that the probe may be separated from the box 20 simply by disconnecting the conductor 10, loosening the corresponding screws at 65, 67, 69 and 71, turning the probe and box relative to each other and lifting the probe free of the opening 62 and the face of the box 20.

Figure 7:
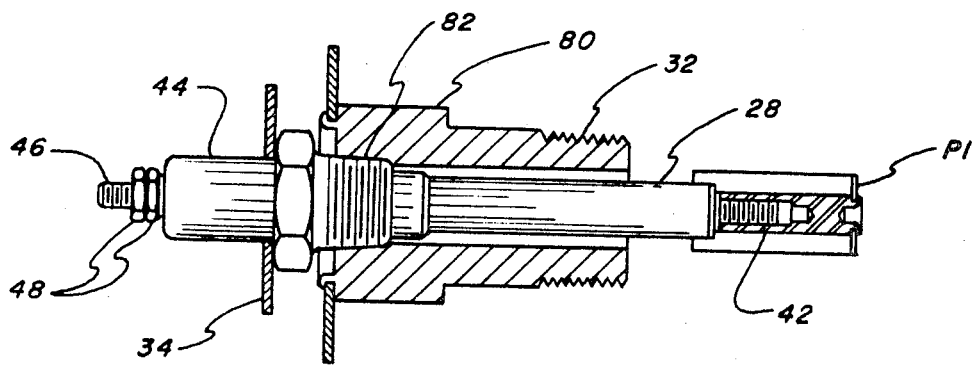
FIG. 7 is a view in partial section of a further embodiment of a probe assembly.

FIG. 7 is a view in partial section of a further embodiment of a probe assembly P. In this embodiment, similar elements are identified by the same labels as were used with respect to the earlier descriptions. A support body 80 is disclosed having a longer body than the support body 30. The body 80 makes it possible to mount the box 20 and the heat sensitive elements therein at a greater distance from the boiler than heretofore and thus provide heat protection. The dry seal 82 is provided within the bore of the support body 80 to seal the interior of the box 20 from water in a boiler tank.

OPERATION OF THE INVENTION

The present invention relates to an electrically operated water level control with a U-shaped probe installed in the boiler itself, through a tapped hole. The control circuit uses the boiler water as a conductor. Under normal operating conditions, the water level will be above the probe, closing the burner circuit. When the water level is below the probe, the burner circuit will be opened and the alarm circuit will be closed.

The control circuit is a series circuit, with an isolation transformer, a momentary contact switch which is normally open, a three contact relay, a momentary contact switch normally closed with a test lamp in parallel and a teflon insulator electrode with a U-shaped stainless steel probe attached. The purpose of the isolation transformer is to provide an isolated ground, to minimize electrical shock hazard.

The relay has three sets of single pole double throw contacts. One set of contacts is used to open and close the burner circuit. One set of contacts is used for the alarm and one set is used in a holding circuit for the manual reset.

Under normal operating conditions of the boiler, the water will be above the probe. Low amperage current will be flowing through the control circuit. The relay coil will be energized holding in the contacts. The dry set of contacts used for the burner circuit will be closed. The contacts used for the alarm will be open. The contacts of the manual reset holding circuit will be closed.

To test for the condition of the control circuit, the button of the momentary contact switch normally closed, is pushed in. The lamp is now in series in the control circuit The brightness of the lamp gives an indication of the condition of the circuit. If it shines brightly, the conductivity of the water is good and the probe is not fouled with deposits of boiler sediment. The dimmer the lamp, the greater the resistance of the water and the fouling of the probe.

When the water level is below the probe, the relay drops out. The relay contacts of the burner circuit are open, stopping the burner. The set of contacts used for the alarm are closed. The third set of contacts used in the manual reset holding circuit are opened. Therefore, at low water conditions, the burner will be off and the alarm will be on.

To bring the boiler back to normal operation conditions, the water level must be brought up to cover the probe. The button of the manual reset switch, a momentary contact normally open type, must be pushed in. This closes the control circuit and energizes the relay coil. The relay pulls in its three sets of contacts. With the contacts of the holding circuit closed, the control circuit will remain energized when the manual reset button is released. The burner will be on and the alarm will be off.

While the principles of the invention have been described above in connection with specific apparatus and applications, it is to be understood that this description is made only by way of example and not as a limitation on the scope of the invention.

We claim:

1. A low water sensing and cut-off system comprising an electric circuit,
   means in said circuit for receiving electric power,
   a probe assembly including a probe element forming one terminal of the electric circuit,
   said probe element enabling the electric circuit to be completed through water in contact with the probe element to a second terminal of the electric circuit, said probe element causing a pre-existing electric circuit to be broken when water drops out of contact with the probe element,
   manually controlled switching means for establishing an electric circuit through the probe element and water in contact with the probe element,
   relay means forming part of said electric circuit,
   said relay means including a normally open and a normally closed contact,
   said manually controlled switching means including a normally open momentary-contact switch responsive to manual pressure to complete said electric circuit and to energize said relay when the electric circuit through the probe assembly is completed,
   said relay operating to close a normally open contact to enable a latching circuit around said normally open momentary-contact switch to maintain an electric circuit so long as water remains in contact with elements of said probe assembly, and
   said relay releasing to reset its contacts in response to loss of contact between said probe assembly and the water.

2. A system as claimed in claim 1, in which
   the switching means includes a normally closed test switch forming part of a test circuit,
   said test circuit includes lamp means shorted across the terminals of the test switch when the switch is at rest.
   said lamp means being energized when said test switch is operated, power is on, and a probe element of the probe assembly is in contact with water in a tank, and
   said lamp means being de-energized when the test switch is operated and either the power is off or the element of the probe is out of contact with the water.

3. A system as claimed in claim 2, in which
   the test switch consists of a momentary-contact, normally closed switch.

4. A system as claimed in claim 2, in which
   the lamp is selected to be visibly responsive to variations in the level of current flow, glowing brighter when the probe assembly is clean and dimmer when the probe is contaminated with mineral deposits.

5. A system as claimed in claim 1, in which
   the probe assembly incorporates a probe element for establishing electrical contact with water in a tank, the probe element is U-shaped to enable a self-cleaning function, and
   the probe element is secured to the probe assembly at the base of the U.

6. A system as claimed in claim 1, in which
   the probe assembly incorporates a probe element for establishing electrical contact with water in a tank, the probe element is formed from a flat strip of stainless steel, and
   the strip of steel is bent at 90° angles, forming a U-shaped probe element having sharp corners to maximize the cleaning effects of heating and cooling on mineral deposits on the probe element.

7. A system as claimed in claim 1, in which
   the probe assembly incorporates a probe element for establishing electrical contact with water in a tank, the probe element is formed from a flat strip of stainless steel, and
   the strip of steel is bent in the form of a candy ribbon when viewed along a narrow edge,
   said bend maximizing the cleaning effects of heating and cooling on mineral deposits which accumulate on the probe element.

8. The invention as claimed in claim 1, in which release of said relay causes said latching circuit to release, thereby returning said system to a neutral state with power terminals connected to an alarm system and the burners turned off,
   release of said relay thus preventing any possibility of boiler damage due to overheating.

9. The invention as claimed in claim 1, including
   a housing, and connector means connecting said probe assembly to said housing,
   said connector means including adjustable elements to hold said housing and said probe assembly together, and
   means by which said adjustable elements may be loosened enabling separation of said housing and said probe assembly without removal of said adjustable elements.

10. The invention as claimed in claim 1, including
    a housing connected to said probe assembly via connector means to complete the low water sensing and cut-off system,
    said probe assembly incorporating means enabling the direct connection of the low water sensing and cut-off system to a hot water tank.

* * * * *